United States Patent
Healy et al.

(10) Patent No.: US 7,515,400 B2
(45) Date of Patent: Apr. 7, 2009

(54) CIRCUIT BREAKER BOX AND MONITORING SYSTEM

(75) Inventors: Brian Healy, Lake Forest, CA (US); Makoto Isomura, Seto (JP); Bassam Chamas, Redondo Beach, CA (US); Garrick Talavera, Rancho Palos Verdes, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 135 days.

(21) Appl. No.: 10/788,287

(22) Filed: Mar. 1, 2004

(65) Prior Publication Data
US 2004/0228071 A1 Nov. 18, 2004

Related U.S. Application Data

(60) Provisional application No. 60/450,343, filed on Feb. 28, 2003.

(51) Int. Cl.
*B60L 1/00* (2006.01)
*B64D 47/00* (2006.01)

(52) U.S. Cl. .................... 361/644; 244/1 R; 244/129.1; 307/9.1

(58) Field of Classification Search ................. 361/644, 361/115; 244/1 R, 129.1; 340/945, 963; 701/14
See application file for complete search history.

(56) References Cited

U.S. PATENT DOCUMENTS

| | | | | |
|---|---|---|---|---|
| 3,307,895 A * | 3/1967 | Renner et al. | ................ | 312/295 |
| 3,618,804 A * | 11/1971 | Krause | ........................ | 220/3.8 |
| 3,689,887 A * | 9/1972 | La Falce et al. | ............ | 340/3.51 |
| 3,728,586 A * | 4/1973 | Inhelder et al. | ............. | 361/626 |
| 3,918,201 A * | 11/1975 | Graziano | ........................ | 49/28 |
| 4,220,298 A * | 9/1980 | Willis | ....................... | 244/129.5 |
| 4,222,039 A * | 9/1980 | Cronin | .................. | 340/815.47 |
| 4,551,632 A * | 11/1985 | Jourdan et al. | ................ | 307/9.1 |
| 4,556,882 A * | 12/1985 | Brifman et al. | ............ | 340/3.44 |
| 4,698,621 A * | 10/1987 | Masot | .......................... | 40/639 |
| 4,706,073 A * | 11/1987 | Vila Masot | .................. | 340/639 |
| 4,860,972 A * | 8/1989 | Lannerd et al. | ......... | 244/135 R |
| 5,267,761 A * | 12/1993 | Curtindale et al. | ............ | 292/81 |
| 5,270,931 A * | 12/1993 | Appleford | ....................... | 701/3 |
| 5,386,363 A * | 1/1995 | Haak et al. | ...................... | 701/3 |
| 5,386,635 A * | 2/1995 | Sheba | ........................... | 30/294 |
| 5,416,705 A * | 5/1995 | Barnett | ......................... | 701/14 |
| 5,544,842 A * | 8/1996 | Smith et al. | .................. | 244/1 R |
| 5,594,285 A * | 1/1997 | Wisbey et al. | ................. | 307/18 |
| 5,629,869 A * | 5/1997 | Johnson et al. | ............... | 702/34 |
| 5,754,113 A * | 5/1998 | Boyer | ......................... | 340/638 |
| 5,786,995 A * | 7/1998 | Coleman | ...................... | 700/83 |
| 5,866,224 A * | 2/1999 | Ang et al. | ...................... | 428/43 |
| 5,875,087 A * | 2/1999 | Spencer et al. | ................. | 361/87 |
| 5,909,180 A * | 6/1999 | Bailey et al. | ................. | 340/639 |
| 5,978,715 A * | 11/1999 | Briffe et al. | .................... | 701/14 |
| 6,038,498 A * | 3/2000 | Briffe et al. | ..................... | 701/3 |
| 6,112,141 A * | 8/2000 | Briffe et al. | .................... | 701/14 |
| 6,195,243 B1 * | 2/2001 | Spencer et al. | ................ | 361/64 |
| 6,297,939 B1 * | 10/2001 | Bilac et al. | ..................... | 361/64 |
| 6,356,422 B1 * | 3/2002 | Bilac et al. | ................. | 361/93.1 |
| 6,470,224 B1 * | 10/2002 | Drake et al. | ................... | 700/22 |
| 6,480,765 B2 * | 11/2002 | Gardner | ........................ | 701/3 |
| 6,535,797 B1 * | 3/2003 | Bowles et al. | ............... | 700/286 |
| 6,577,963 B1 * | 6/2003 | Cordray et al. | ............... | 702/65 |
| 6,663,802 B2 * | 12/2003 | Sacripante | ................... | 264/1.7 |
| 6,664,656 B2 * | 12/2003 | Bernier | ........................ | 307/9.1 |
| 6,696,980 B1 * | 2/2004 | Langner et al. | ............. | 340/971 |
| 6,881,898 B2 * | 4/2005 | Baker et al. | ...................... | 174/50 |
| 6,937,164 B2 * | 8/2005 | Thomson et al. | ............. | 340/945 |
| 6,988,246 B2 * | 1/2006 | Kopitzke et al. | ............ | 715/810 |
| 7,130,724 B2 * | 10/2006 | Petersen et al. | ................. | 701/3 |
| 2003/0048007 A1 * | 3/2003 | Mercier et al. | ............. | 307/125 |
| 2003/0086228 A1 * | 5/2003 | Papallo et al. | ............... | 361/93.1 |
| 2005/0121978 A1 * | 6/2005 | McAvoy | ....................... | 307/43 |
| 2006/0108873 A1 * | 5/2006 | Hamasaki et al. | ........... | 307/10.1 |

FOREIGN PATENT DOCUMENTS

FR 2803120 A1 * 6/2001
WO WO 0031844 A1 * 6/2000

OTHER PUBLICATIONS

Photograph of the cockpit of the Socata Trinidad Aircraft (1 page).
Photograph of the pilot foot well of the Cirrus SR20 Aircraft (1 page).
Lancair Columbia 400 Web Page, http://www.lancairusa.com/tour40005.html, Jun. 10, 2002, (1 page).

* cited by examiner

*Primary Examiner*—Michael V Datskovskiy
(74) *Attorney, Agent, or Firm*—Finnegan, Henderson, Farabow, Garrett & Dunner, LLP

(57) ABSTRACT

The present invention relates to a circuit breaker box and monitoring system. The circuit breaker box includes a circuit breaker panel and a door allowing the circuit breaker panel to be hidden from view. The circuit breaker monitoring system will inform the pilot if a circuit breaker has tripped.

28 Claims, 15 Drawing Sheets

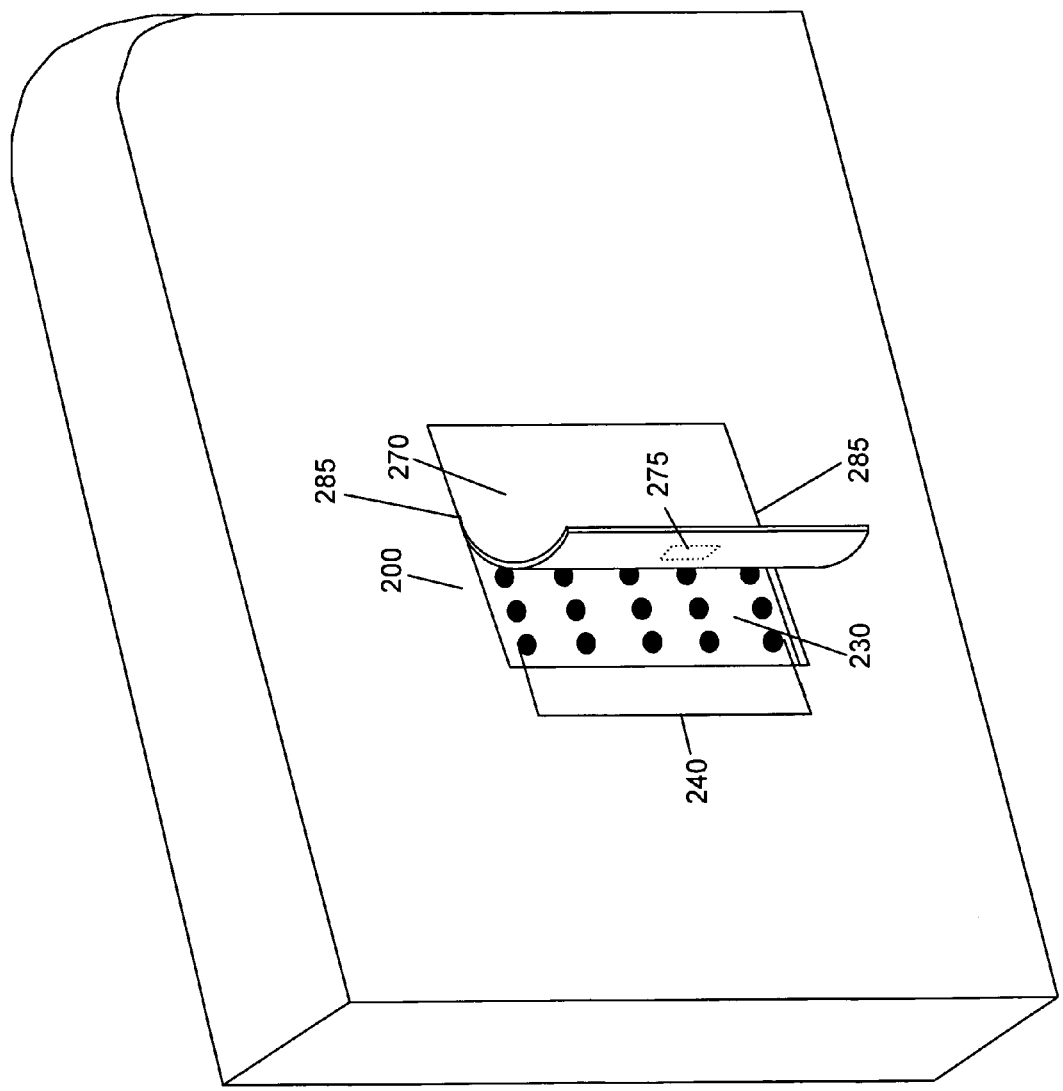
Figure 2D (Amended)

CIRCUIT BREAKER BOX AND MONITORING SYSTEM

I. CROSS-REFERENCE TO RELATED APPLICATION

This application claims the benefit of U.S. Provisional Application No. 60/450,343, filed Feb. 28, 2003, by Brian Healy, Makoto Isomura, Bassam Chamas, and Garrick Talayera and titled CIRCUIT BREAKER BOX AND MONITORING SYSTEM, the disclosure of which is expressly incorporated herein by reference.

II. BACKGROUND

A. Technical Field

The present invention relates to an aircraft circuit breaker box and monitoring system.

B. Related Art

In most aircraft, circuit breakers are used to prevent overloading of electrical components and conductors. In general, if the current flowing through a particular conductor exceeds some predetermined level, the circuit breaker will "trip," that is, automatically open, and interrupt the flow of current through the conductor to the connected component. The circuit breaker then needs to be reset before power is restored to the component.

Federal Aviation Administration ("FAA") regulations require that the circuit breakers be accessible and resettable during flight. Typically, in order to meet these regulations, the circuit breakers are mounted in a panel that is visible to and within reaching distance of the pilot. In addition, each circuit breaker is labeled to allow the pilot to identify the component to which each circuit breaker corresponds. Typically, when a circuit breaker trips, a shaft of the circuit breaker elongates to display a contrasting color, which indicates that the circuit breaker has been tripped. When the circuit breaker is reset, the shaft is retracted and the contrasting color is no longer visible.

When the circuit breakers are combined with the large number of switches, instruments, and gauges contained in a typical cockpit, the cockpit can seem extremely cluttered. This can lead to pilot confusion and delay when a circuit breaker is tripped. It can also affect the pilot's operation of the other instruments.

Thus, there is a need for a structure for the circuit breakers that will reduce the clutter in the cockpit but still allow the circuit breakers to be accessible and able to be reset during flight.

III. SUMMARY

An apparatus consistent with the present invention provides an aircraft circuit breaker system. The aircraft circuit breaker system includes a circuit breaker box comprising at least one open surface; a circuit breaker panel located in the circuit breaker box such that it is accessible through the open surface; a plurality of circuit breakers located on the circuit breaker panel; and a door mounted on the circuit breaker box and operable between a first position with respect to the open surface covering the circuit breaker panel and a second position with respect to the open surface revealing the circuit breaker panel.

A method consistent with the present invention provides a method of monitoring circuit breakers in an aircraft with a circuit breaker monitoring system. The method includes monitoring a circuit breaker panel in an aircraft, receiving a signal indicating detection of circuit breaker trip event, and sending a warning signal to a display in the aircraft.

Additional aspects of the invention are disclosed and defined by the appended claims. It is to be understood that both the foregoing general description and the following detailed description are exemplary and explanatory only and are not restrictive of the invention as claimed.

IV. BRIEF DESCRIPTION OF THE DRAWINGS

The accompanying drawings, which are incorporated in and constitute a part of this specification, illustrate several embodiments of the invention and, together with the following description, serve to explain the principles of the invention.

In the drawings:

FIG. 2D is a perspective view of a circuit breaker box with a door having a tear-away feature consistent with an embodiment of the present invention, as shown in FIG. 2A;

V. DESCRIPTION OF THE EMBODIMENTS

A. Introduction

Apparatus and methods consistent with the present invention will now be described with respect to a circuit breaker box and monitoring system. The following examples are only representative of embodiments and implementations consistent with the invention. Other embodiments and other implementations may also be used.

B. Apparatus and Methods

Figure 1A:
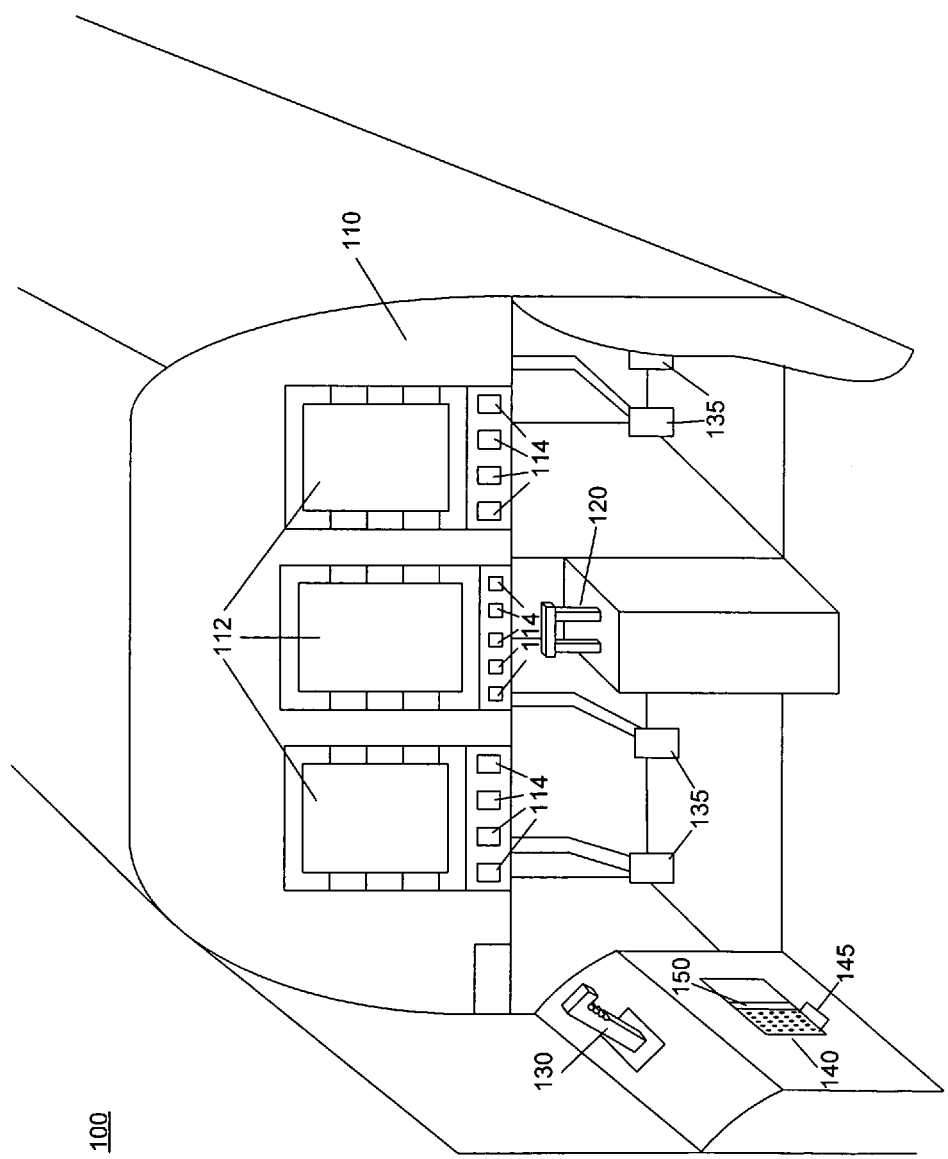
FIG. 1A is a front perspective view of a cockpit for an aircraft consistent with one embodiment of the invention.

FIG. 1A is a front perspective view of a cockpit for an aircraft consistent with one embodiment of the invention. As shown in FIG. 1A, in one implementation, a cockpit 100 includes an instrument panel 110, throttle control 120, control stick 130, rudder pedals 135, and a circuit breaker box 140. This implementation is merely exemplary, and other implementations may also be used.

Instrument panel 110 displays information regarding the aircraft to the pilot during flight to facilitate control by the pilot of certain aspects of the aircraft. In one implementation, instrument panel 110 includes video display screens 112 and switches 114. Video display screens 112 can display information about the status of the aircraft, such as speed, altitude, fuel, and other information, or maps and geographic information. Switches 114 include controls for the aircraft, such as light switches, fuel switches, landing gear switches, and other switches. Switches 114 can also control what is displayed on video display screens 112. These implementations are merely exemplary, and other implementations may also be used.

Throttle control 120 includes controls for varying the power of the aircraft engine. In one implementation, throttle control 120 includes a throttle handle which can be moved forward and back to increase or decrease the power of the aircraft engine. This implementation is merely exemplary, and other implementations may also be used.

Control stick 130 controls the longitudinal and lateral control surfaces of the aircraft, such as the elevator or ailerons. In one implementation, the pilot moves control stick 130 to alter the direction of the aircraft. This implementation is merely exemplary, and other implementations may also be used.

Rudder pedals 135 control the rudder of the aircraft. In one implementation, the pilot or co-pilot depresses rudder pedals 135 to operate the rudder. This implementation is merely exemplary, and other implementations may also be used.

Figure 1B:
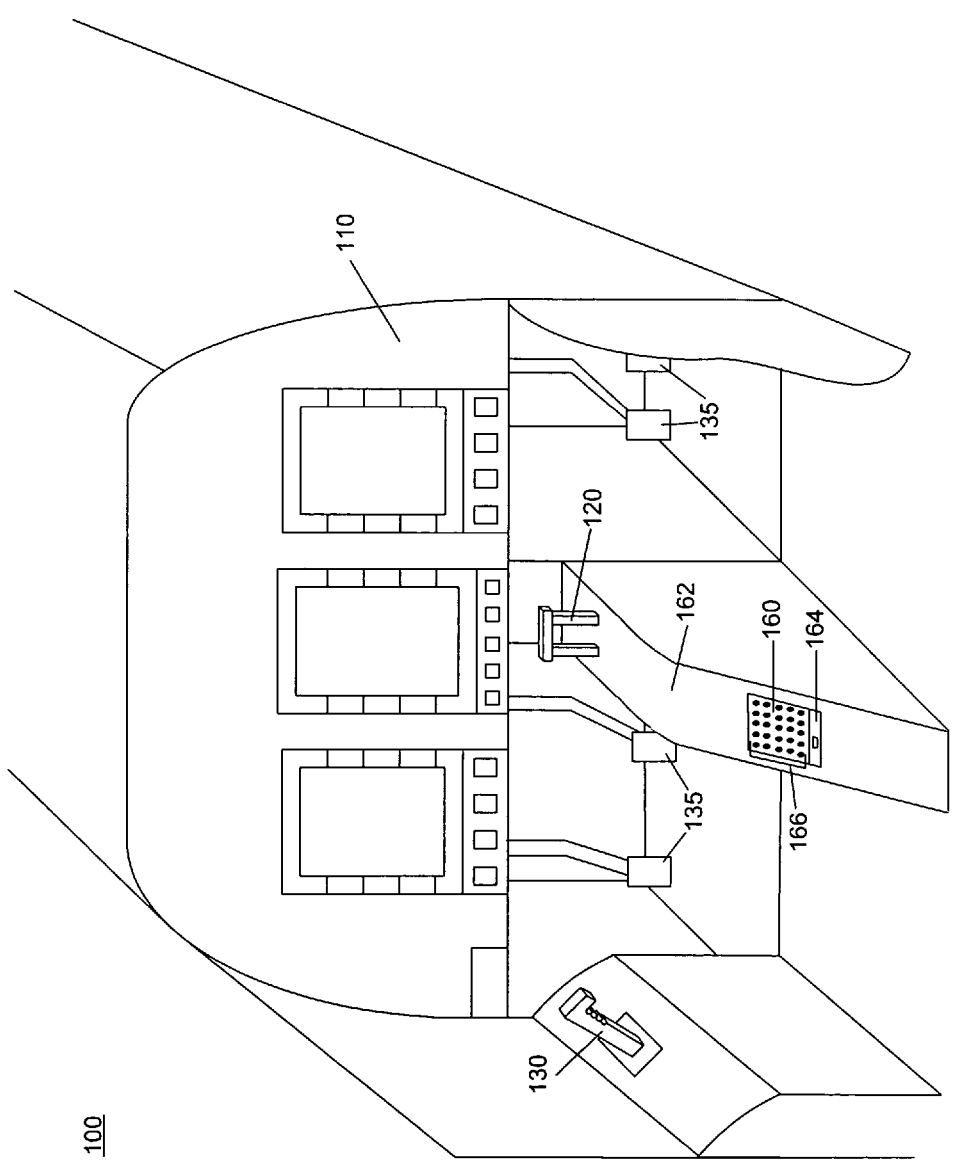
FIG. 1B is a front perspective view of a cockpit for an aircraft consistent with another embodiment of the invention.
Figure 1C:
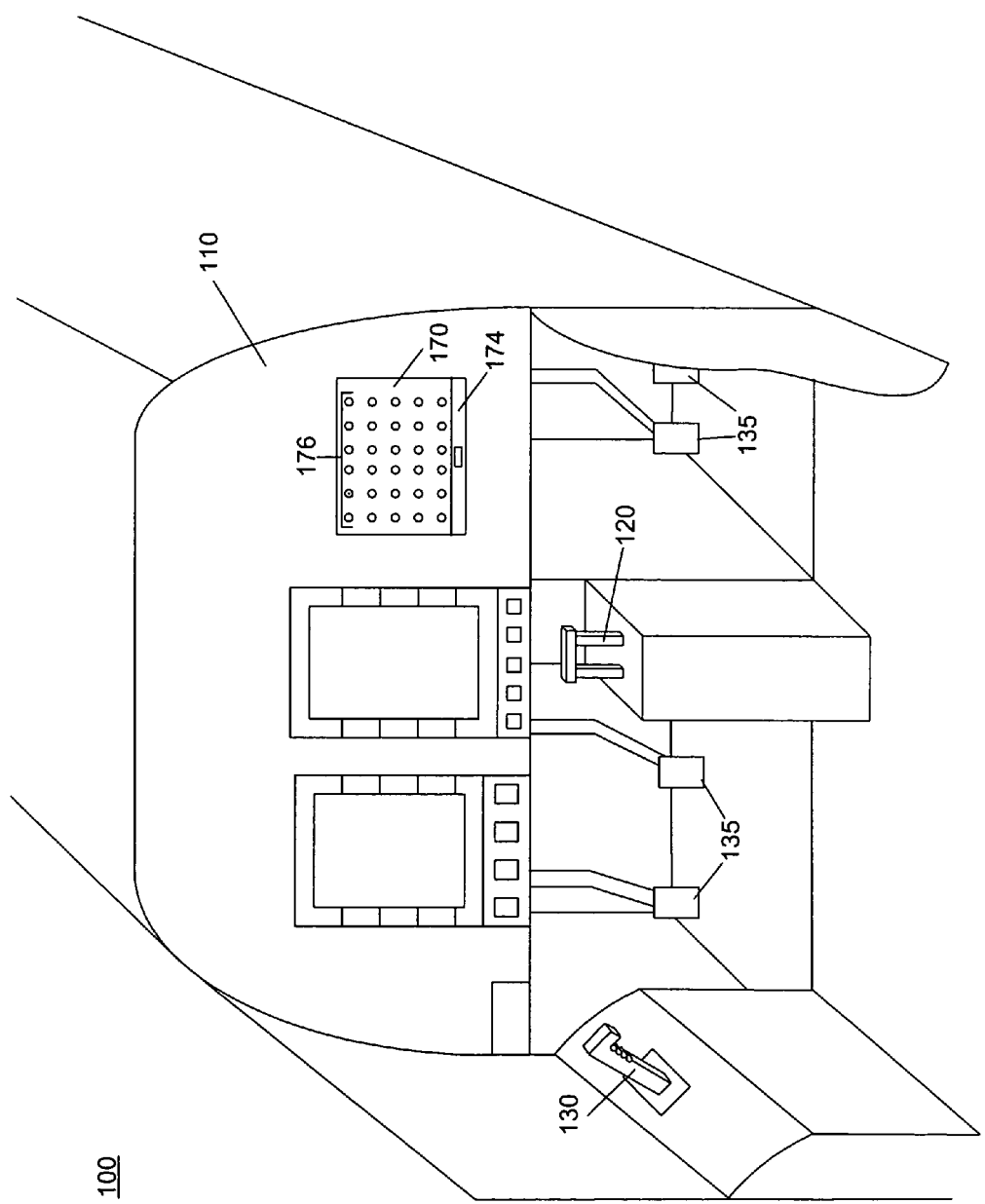
FIG. 1C is a front perspective view of a cockpit for an aircraft consistent with another embodiment of the invention.
Figure 1D:
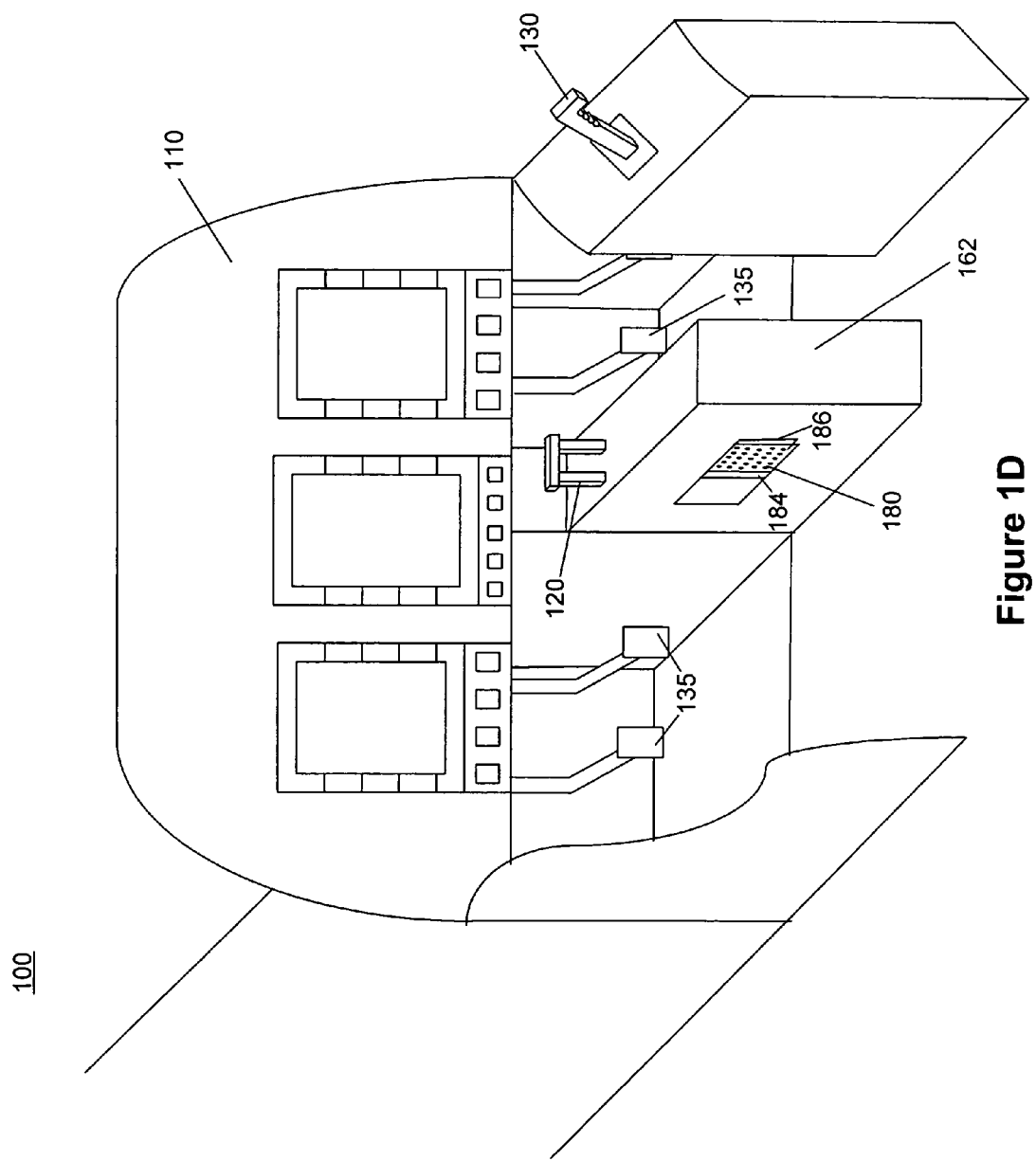
FIG. 1D is a front perspective view of a cockpit for an aircraft consistent with another embodiment of the invention.

Circuit breaker box 140 provides a compartment for circuit breakers 145. Circuit breakers 145 prevent the overloading of electrical components in the aircraft. In one implementation, circuit breaker box 140 includes a door 150, which may be opened or closed to either reveal or cover circuit breakers 145. Circuit breaker box 140 is further described in FIGS. 2A-2D. In the implementation shown in FIG. 1A, circuit breaker box 140 is located on the lower left hand side of the cockpit. This allows the pilot to reach circuit breaker box 140 while seated in the cockpit. Other locations are possible as shown in FIGS. 1B-1D. These implementations are merely exemplary, and other implementations may also be used.

FIG. 1B is a front perspective view of a cockpit for an aircraft consistent with another embodiment of the invention. As shown in FIG. 1B, in one implementation, a cockpit 100 includes an instrument panel 110, throttle control 120, control stick 130, rudder pedals 135, a center console 162, and a circuit breaker box 160. This implementation is merely exemplary, and other implementations may also be used.

In this implementation, circuit breaker box 160 is located on the front side of the center console 162 and includes a door 164, which may be opened or closed to either reveal or cover circuit breakers 166. This location allows the pilot and co-pilot to reach circuit breaker box 160 while seated in the cockpit. This implementation is merely exemplary, and other implementations may also be used.

FIG. 1C is a front perspective view of a cockpit for an aircraft consistent with another embodiment of the invention. As shown in FIG. 1C, in one implementation, a cockpit 100 includes an instrument panel 110, throttle control 120, control stick 130, rudder pedals 135, and a circuit breaker box 170. This implementation is merely exemplary, and other implementations may also be used.

In this implementation, circuit breaker box 170 is located on the instrument panel 110 and includes a door 174, which may be opened or closed to either reveal or cover circuit breakers 176. This location also allows the pilot to reach circuit breaker box 170 while seated in the cockpit. This implementation is merely exemplary, and other implementations may also be used.

FIG. 1D is a front perspective view of a cockpit for an aircraft consistent with another embodiment of the invention. As shown in FIG. 1D, in one implementation, a cockpit 100 includes an instrument panel 110, throttle control 120, control stick 130, rudder pedals 135, a center console 162, and a circuit breaker box 180. This implementation is merely exemplary, and other implementations may also be used.

In this implementation, circuit breaker box 180 is located on the left side of center console 162 and includes a door 184, which may be opened or closed to either reveal or cover circuit breakers 186. This location also allows the pilot to reach circuit breaker box 180 while seated in the cockpit. This implementation is merely exemplary, and other implementations may also be used.

Figure 2A:
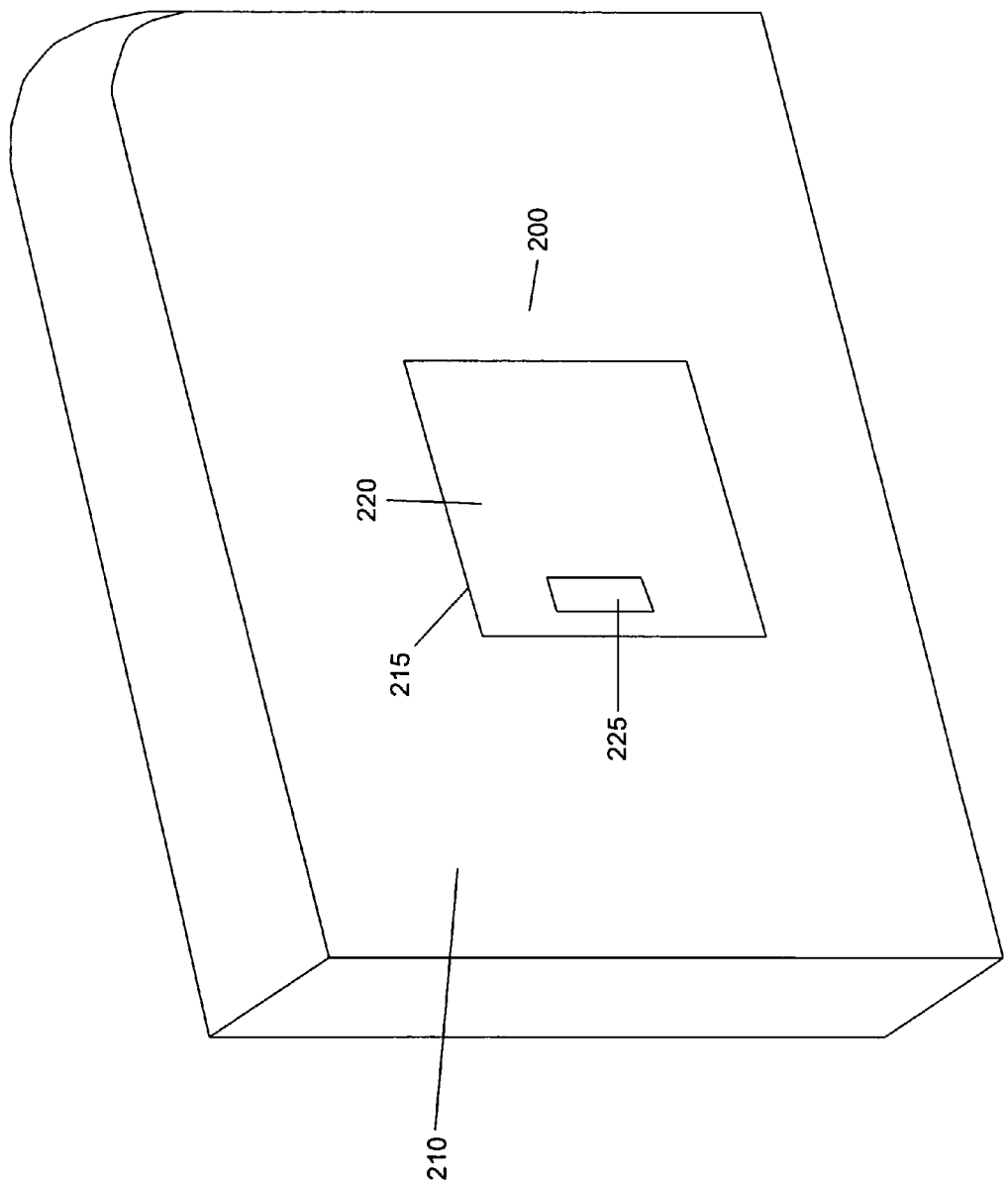
FIG. 2A is a perspective view of a circuit breaker box consistent with an embodiment of the present invention, as shown in FIG. 1A.

FIG. 2A is a perspective view of a circuit breaker box consistent with an embodiment of the present invention, as shown in FIG. 1A. As shown in FIG. 2A, in one implementation, circuit breaker box 200 is located on cockpit panel 210. Cockpit panel 210 can be any portion of the cockpit as shown in FIGS. 1A-1D or any other portion of the cockpit. This implementation is merely exemplary, and other implementations may also be used.

Figure 2B:
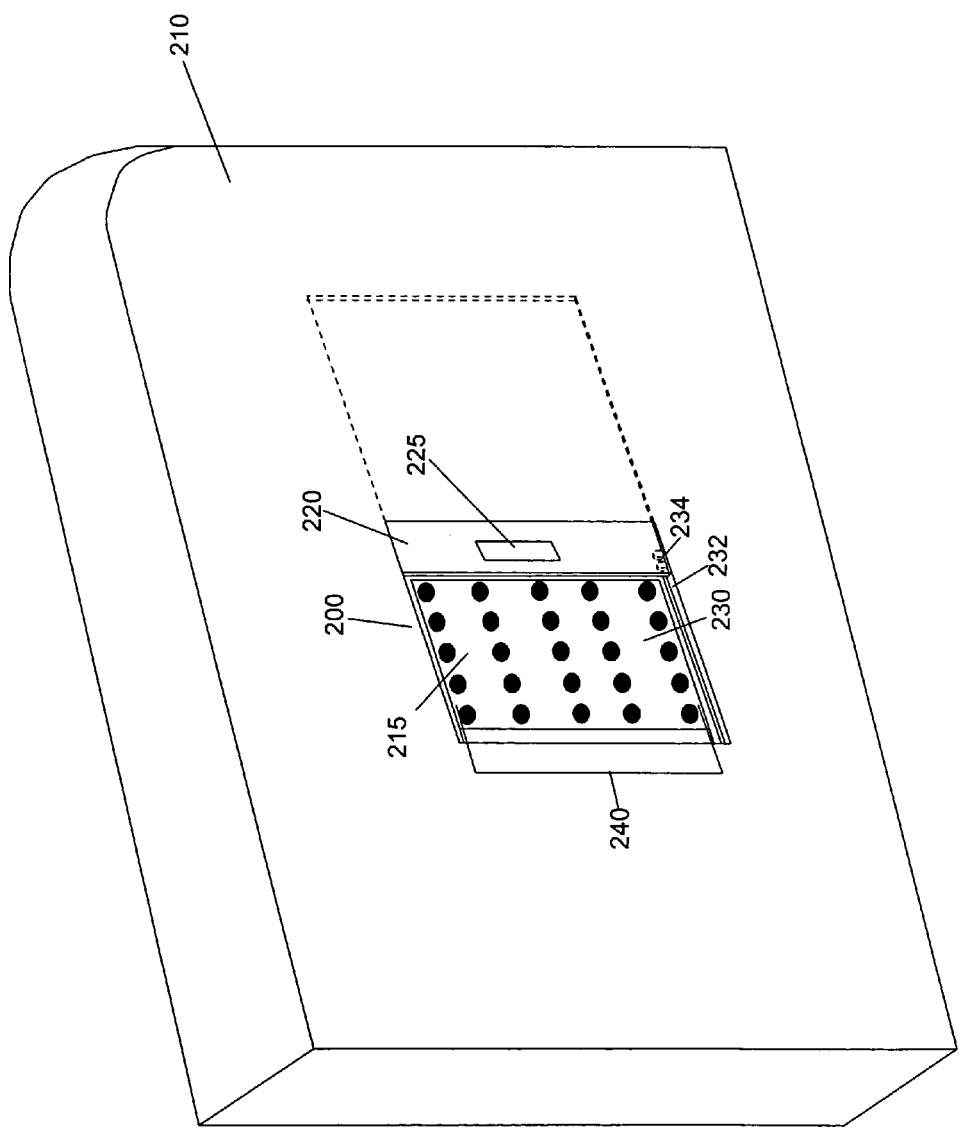
FIG. 2B is a perspective view of a circuit breaker box with a door in the open position consistent with an embodiment of the present invention, as shown in FIG. 2A.

Circuit breaker box 200 includes an open surface 215, a door 220, and a circuit breaker panel 230 (not shown, but shown in FIG. 2B). Circuit breaker panel 230 (not shown, but shown in FIG. 2B) includes a plurality of circuit breakers (not shown) corresponding to various electrical components in the aircraft. Door 220 is operable between a first (closed) position (shown in FIG. 2A) with respect to open surface 215 covering circuit breaker panel 230 and a second (open) position with respect to open surface 215 revealing circuit breaker panel 230. As shown in FIG. 2A, when door 220 is closed, circuit breaker panel 230 cannot be seen. In another implementation, however, door 220 may be transparent or semi-transparent. In this implementation, circuit breaker panel 230 would be visible when door 220 is closed.

In one implementation, door 220 is operated by a sliding mechanism (not shown, but shown in FIG. 2B). In this implementation, for example, the sliding mechanism allows door 220 to be slid toward the front of the cockpit (the second position) to be opened and to be slid toward the back of the cockpit (the first position) to be closed by application of a nominal force. In one implementation, this sliding mechanism consists of tracks 232 (not shown, but shown in FIG. 2B) located in cockpit panel 210 and several wheels 234 (also not shown, but shown in FIG. 2B) are attached to door 220 and located on the tracks. The wheels will rotate along the tracks thereby allowing door 220 to be slid open and closed. In another implementation, an electric motor (not shown) will be used to slide door 220 opened and closed. In another implementation, door 220 may be operated by means of hinges connected to door 220 and cockpit panel 210. These implementations are merely exemplary, and other implementations may also be used.

In another implementation, as shown in FIG. 2A, door 220 includes a handle 225. Handle 225 provides a place for the pilot to grip door 220 and manually slide door 220 to the first and second positions by application of a nominal force. In one implementation, handle 225 comprises an indentation in door 220. These implementations are merely exemplary, and other implementations may also be used.

FIG. 2B is a perspective view of a circuit breaker box with a door in the open position consistent with an embodiment of the present invention, as shown in FIG. 2A. As shown in FIG. 2B, circuit breaker box 200 includes open surface 215, door 220, and circuit breaker panel 230. FIG. 2B shows door 220 operated to the second (open) position with respect to open surface 215. As described above, circuit breaker panel 230 includes a plurality of circuit breakers 240 corresponding to various electrical components in the aircraft. In this implementation, circuit breaker panel 230 includes twenty-five circuit breakers 240, however, any number of circuit breakers 240 may be used. This implementation is merely exemplary, and other implementations may also be used.

In one implementation, as described in FIG. 2A, door 200 includes a handle 225 which allows the pilot to manually slide door 200 to a first or second position so as to either cover or reveal circuit breaker panel 230 by application of a nominal force. As shown by the dashed lines in FIG. 2B, when door 200 is in the second position (i.e. open), a portion of door 200 is located behind cockpit panel 210. In one implementation, a sliding mechanism allows door 220 to be slid toward the front of the cockpit (the second position) to be opened and to be slid toward the back of the cockpit (the first position) to be closed by application of a nominal force. In one implementation, this sliding mechanism consists of tracks 232 located in cockpit panel 210 and several wheels 234 are attached to door 220 and located on the tracks. The wheels will rotate along the tracks thereby allowing door 220 to be slid open and closed. In another implementation, door 200 may be operated by an electric motor. In yet another implementation, door 220 may be operated by means of hinges 211 connected to door 220 and cockpit panel 210, as shown in FIG. 2F. In this implementation, a pilot would grasp handle 225 and manually swing door 220 open and closed. These implementations are merely exemplary, and other implementations may also be used.

In another implementation, circuit breaker box 200 will include a warning indicator, such as a warning light, (not shown). In this implementation when one of circuit breakers 240 is tripped, the warning indicator will be activated (e.g., illuminated) by the system upon detection of a trip event, to alert the pilot of the trip event. The warning indicator may be located in circuit breaker box 200 or outside of circuit breaker box 200, for example, on the cockpit panel or just outside of circuit breaker box 200. These implementations are merely exemplary, and other implementations may also be used.

Figure 2C:
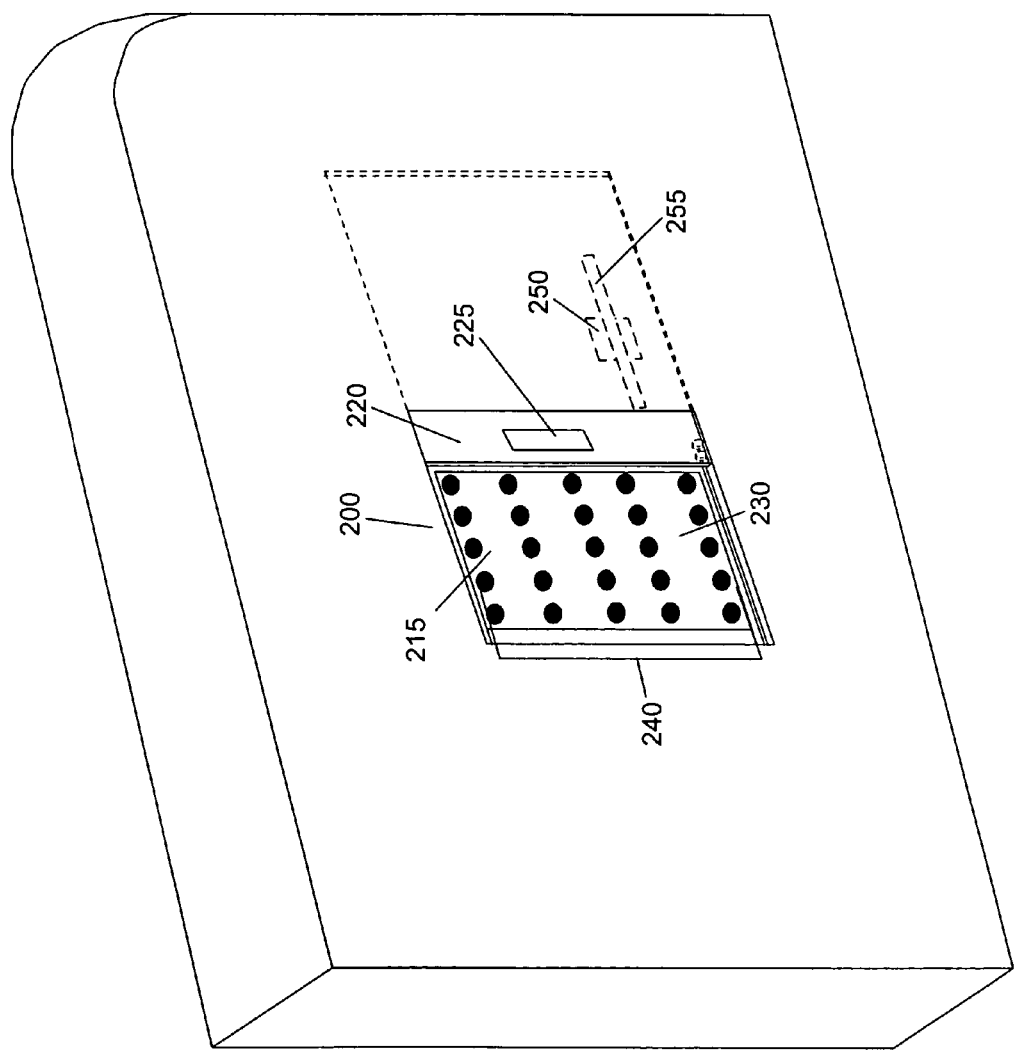
FIG. 2C is a perspective view of a circuit breaker box operated by an electric motor consistent with an embodiment of the present invention, as shown in FIG. 2A.

FIG. 2C is a perspective view of a circuit breaker box operated by an electric motor consistent with an embodiment of the present invention, as shown in FIG. 2A. As shown in FIG. 2C, circuit breaker box 200 includes open surface 215, door 220, and circuit breaker panel 230. As described above, circuit breaker panel 230 includes a plurality of circuit breakers 240 corresponding to various electrical components in the aircraft. In this implementation, circuit breaker panel 230 includes twenty-five circuit breakers 240, however, any number of circuit breakers 240 may be used. This implementation is merely exemplary, and other implementations may also be used.

As shown in FIG. 2C, door 200 includes a handle 225, an electric motor 250, and a threaded rod 255 attached to door 200. In this implementation, electric motor 250 rotates threaded rod 255 which causes door 200 to slide to a first position or a second position so as to either cover or reveal circuit breaker panel 230. In one implementation, electric motor 250 is operated by a switch (not shown) on door 200. In another implementation, electric motor 250 is operated by a switch (not shown) on the instrument panel. In yet another implementation, electric motor 250 is operated by a circuit breaker monitoring system. These implementations are merely exemplary, and other implementations may also be used.

FIG. 2D is a perspective view of a circuit breaker box with a door having a tear-away feature consistent with an embodiment of the present invention, as shown in FIG. 2A. As shown in FIG. 2D, circuit breaker box 200 includes a door 270 and circuit breaker panel 230. Circuit breaker panel 230 includes a plurality of circuit breakers 240. This implementation is merely exemplary, and other implementations may also be used.

In normal operation door 270 may be operated between a first (closed) and second (open) position by application of a nominal force to cause door to 270 to slide, as described in FIGS. 2A-2C. In some circumstances, however, door 270 may not be able to be slid open as described in FIGS. 2A-2C due to some type of failure, such as a mechanical failure or a failure of an electrical motor. In these circumstances, the pilot must still be able to access circuit breaker panel 230 if a circuit breaker is tripped. In one implementation, the pilot may grasp door 270 by a handle 275 and pull outward from the cockpit panel 210 with a significant force, that is, a force greater than that applied to the door in normal operation, and in a different direction than is applied in normal operation. This will result in door 270 tearing away from cockpit panel 210 and revealing circuit breaker panel 230. In one implementation, door 270 would be made of a flexible material, such as plastic. In another implementation, the tear-away feature would be a one-time use feature only, requiring the door to be replaced after being torn-away. That is, door 270 is removably mounted to circuit breaker box 200. This implementation is merely exemplary, and other implementations may also be used.

Figure 2E:
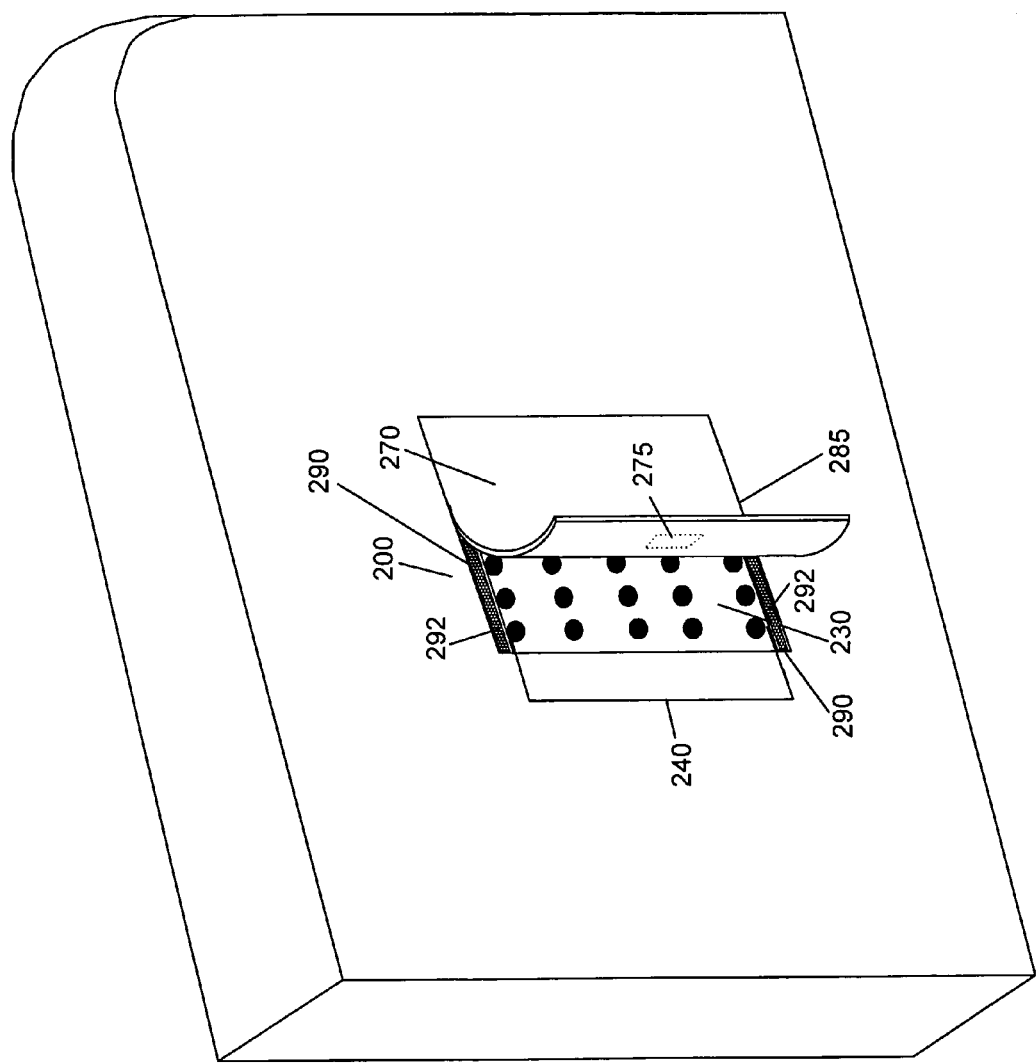
FIG. 2E is a perspective view of a circuit breaker box with a door having a tear-away feature including a fastener consistent with an embodiment of the present invention, as shown in FIG. 2A.
Figure 2F:
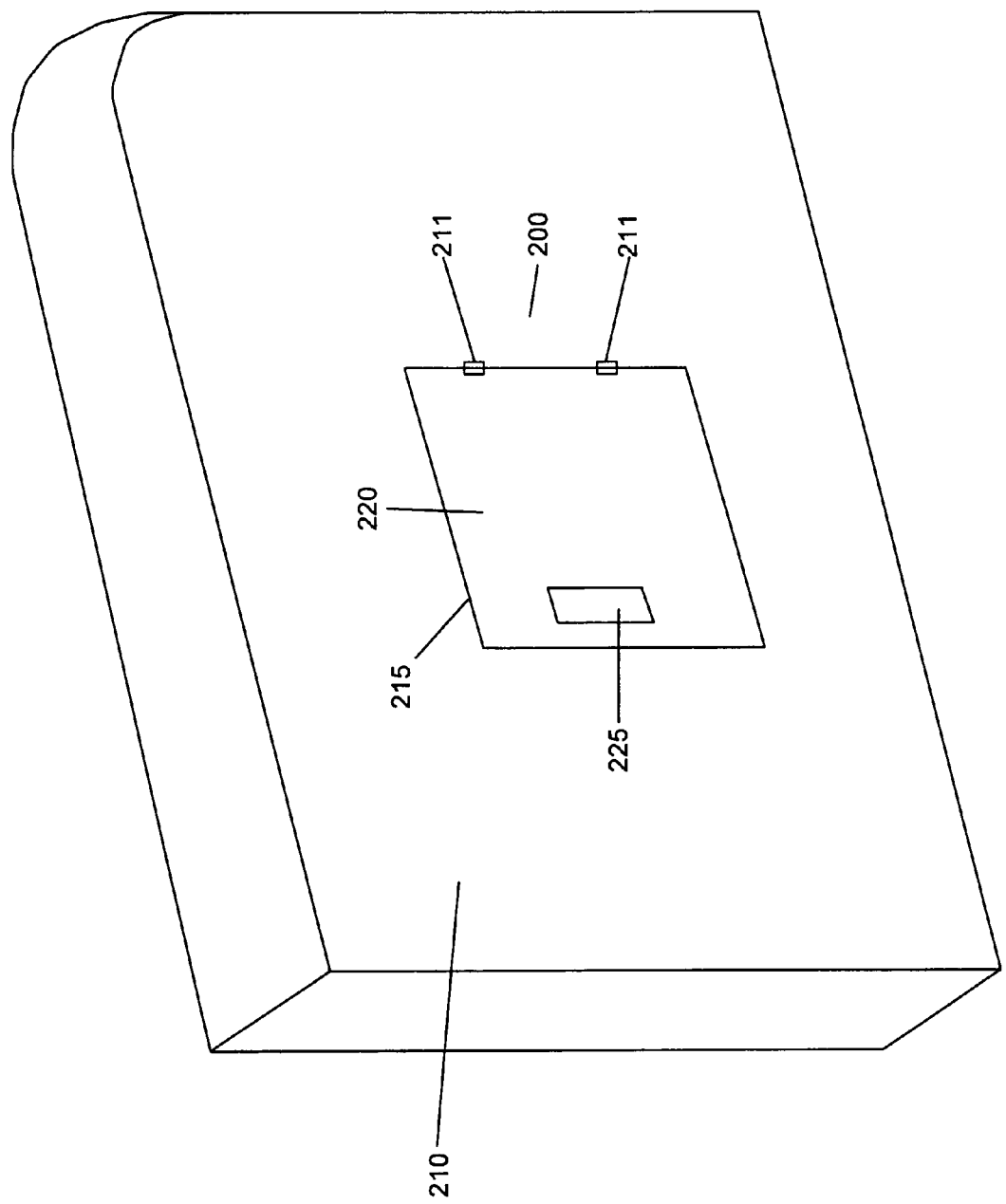
FIG. 2F is a perspective view of a circuit breaker box with a door having hinges consistent with an embodiment of the present invention, as shown in FIG. 2A.

In one implementation, as shown in FIG. 2D, tear-away door 270 includes small perforations 285 located around its outer edges. In this implementation, these perforation 285 will allow tear-away door 270 to be more easily pulled away from cockpit panel 210. In another implementation, as shown in FIG. 2E, door 270 would comprise a frame portion 290 and a cover portion attached to that frame portion and covering circuit breaker panel 230. In this implementation, the portion would be attached to the frame portion 290 with fasteners 292, such as a hook and loop fastener or snaps. This would allow the cover portion to be torn away from the frame portion 290 to reveal circuit breaker panel 230, and also allow the panel portion to be quickly reattached at a later time. This implementation is merely exemplary, and other implementations may also be used.

FIGS. 1A-2D have described several implementations of a circuit breaker box. As described in those figures, when the circuit breakers are not in use a door may be closed to hide the circuit breakers from view. In this implementation, the pilot may not readily notice if a circuit breaker has been tripped. In one implementation, a circuit breaker monitoring system is used to warn the pilot that a circuit breaker has tripped. The pilot may then open the door to the circuit breaker box and reset the tripped circuit breaker. A circuit breaker monitoring system for use with a circuit breaker box will now be described with respect to FIGS. 3-7.

Figure 3:
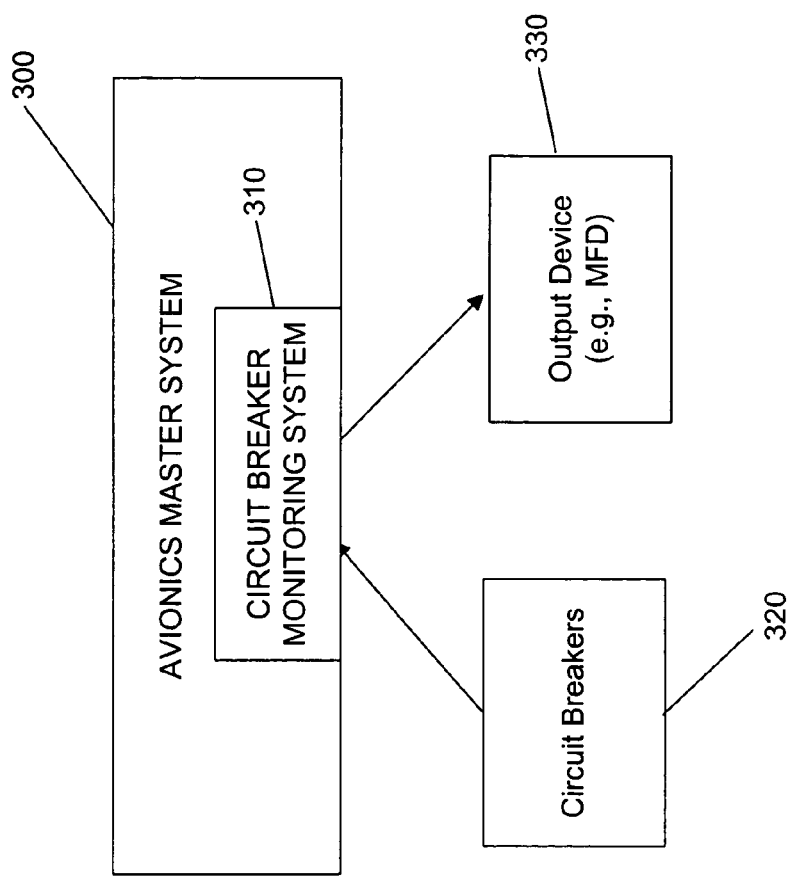
FIG. 3 is a block diagram of a circuit breaker monitoring system consistent with an embodiment of the present invention.

FIG. 3 is a block diagram of a circuit breaker monitoring system consistent with an embodiment of the present invention. As shown in FIG. 3, an Avionics Master System 300 includes a circuit breaker monitoring system 310. Avionics Master System 300 operates as a task on one or more avionics computers (not shown) and is used to control the operations of various aspects of the aircraft. Circuit breaker monitoring system 310 is a software or hardware module used to monitor the status of the circuit breakers and inform the pilot that a circuit breaker has tripped. This implementation is merely exemplary, and other implementations may also be used.

As shown in FIG. 3, circuit breaker monitoring system 310 monitors the status of circuit breakers 320. As described above, circuit breakers 320 are used to prevent overloading of electrical components. In general, if the current flowing through conductors to a particular component exceeds some predetermined level, one of the circuit breakers 320, connected in series with the component, will "trip" and shut off the flow of current to the component. The individual circuit breaker of circuit breakers 320 then needs to be reset before current is restored to the component.

In this implementation, if one of circuit breakers 320 trips, a signal will be sent to circuit breaker monitoring system 310. In one implementation, the signal will inform circuit breaker monitoring system 310 only that one of circuit breakers 320 has tripped. In another implementation, the signal will also inform circuit breaker monitoring system 310 of the identity of the specific circuit breaker of circuit breakers 320 that has tripped. These implementations are merely exemplary, and other implementations may also be used.

As shown in FIG. 3, upon receiving a signal that one of circuit breakers 320 has tripped, circuit breaker monitoring system 310 will send a signal to output device 330. Output device 330 may be any device in the cockpit capable of informing the pilot that a circuit breaker has tripped. In one implementation, output device 330 is a Multifunction Display ("MFD"). Upon receiving the signal from the circuit breaker monitoring system 310, output device 330 will inform the pilot that one of circuit breakers 320 has tripped. In one implementation, output device 330 will inform the pilot which specific circuit breaker of circuit breakers 320 has tripped. These implementations are merely exemplary, and other implementations may also be used.

Figure 4:
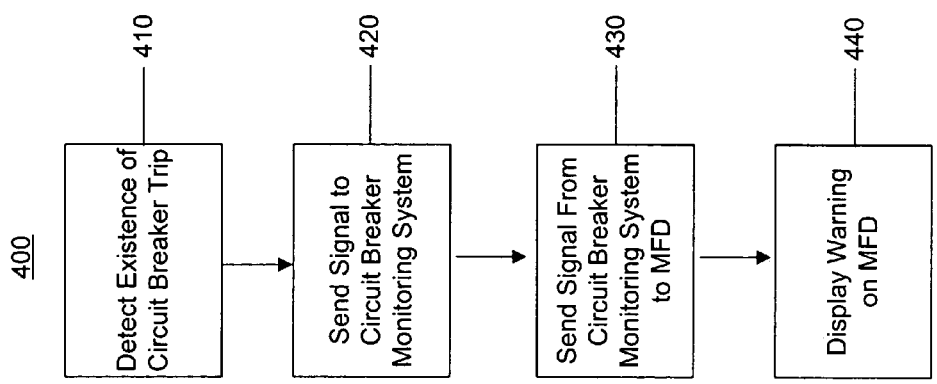
FIG. 4 is a flow diagram illustrating the operation of a circuit breaker monitoring system consistent with an embodiment of the present invention, as shown in FIG. 3.

FIG. 4 is a flow diagram illustrating the operation of a circuit breaker monitoring system consistent with an embodiment of the present invention, as shown in FIG. 3. As shown in FIG. 4, in one implementation, operation 400 comprises detect existence of circuit breaker trip 410, send signal to circuit breaker monitoring system 420, send signal from circuit breaker monitoring system to MFD 430, and display warning on MFD 440.

In this implementation, operation 400 begins with detect existence of circuit breaker trip 410. Detect existence of circuit breaker trip 410 describes the situation where a circuit breaker in the aircraft trips to prevent the overloading of an electrical component in the aircraft. Detect existence of circuit breaker trip 410 may be accomplished by any suitable known method, such as using a current sensor to detect an uncommanded change in current flow through one or more current branches.

In this implementation, detect existence of circuit breaker trip 410 is followed by send signal to circuit breaker monitoring system 420. Send signal to circuit breaker monitoring system 420 describes the sending of a warning signal to the circuit breaker monitoring system that a circuit breaker has tripped. In one implementation, the signal sent to the circuit breaker monitoring system will inform the system only that a circuit breaker has tripped. In another implementation, the signal will identify the specific circuit breaker that has tripped. These implementations are merely exemplary, and other implementations may also be used.

In this implementation, send signal to circuit breaker monitoring system 420 is followed by send signal from circuit breaker monitoring system to MFD 430. Send signal from circuit breaker monitoring system to MFD 430 describes the sending of a signal to the MFD that a circuit breaker has tripped. In one implementation, the signal sent to the MFD will inform the MFD only that a circuit breaker has tripped. In another implementation, the signal will identify the specific circuit breaker that has tripped. These implementations are merely exemplary, and other implementations may also be used.

In this implementation, send signal from circuit breaker monitoring system to MFD 430 is followed by display warning on MFD 440. Display warning on MFD 440 describes the displaying of a warning to the pilot that a circuit breaker has tripped. In one implementation, the MFD will display only that a circuit breaker has tripped. In another implementation, the MFD will identify the specific circuit breaker that has tripped. Display warning on MFD 440 is further described in FIGS. 5-7. These implementations are merely exemplary, and other implementations may also be used.

Figure 5:
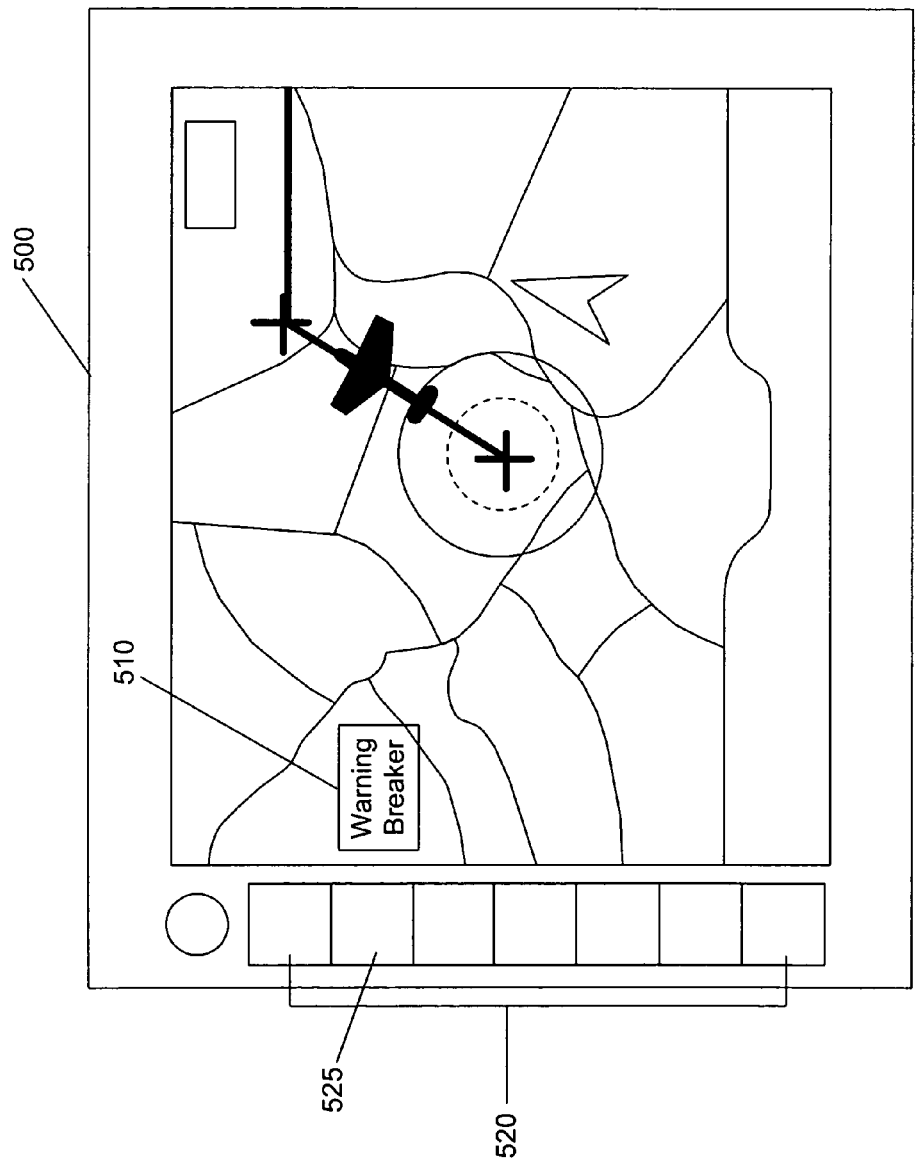
FIG. 5 illustrates a multi-function display (MFD) displaying a circuit breaker warning signal consistent with an embodiment of the present invention, as shown in FIG. 4.

FIG. 5 illustrates a multi-function display (MFD) displaying a circuit breaker warning signal consistent with an embodiment of the present invention, as shown in FIG. 4. MFD 500 may display, for example, geographic and instrument data to the pilot. In one implementation, MFD 500 includes manually operated input devices, such as buttons 520, which allow for the operation of the MFD and allow the pilot to display different information regarding the status of the plane. This implementation is merely exemplary, and other implementations may also be used.

As shown in FIG. 5, in this implementation, if a circuit breaker trips, a warning signal is sent to MFD 500 as described in reference to FIG. 4. As shown in FIG. 5, MFD 500 displays a warning 510 on MFD 500. Warning 510 informs the pilot that a circuit breaker has tripped. In one implementation, the pilot may press a button 525 to display further information regarding the tripped circuit breaker, as further shown in FIG. 6. This implementation is merely exemplary, and other implementations may also be used.

Figure 6:
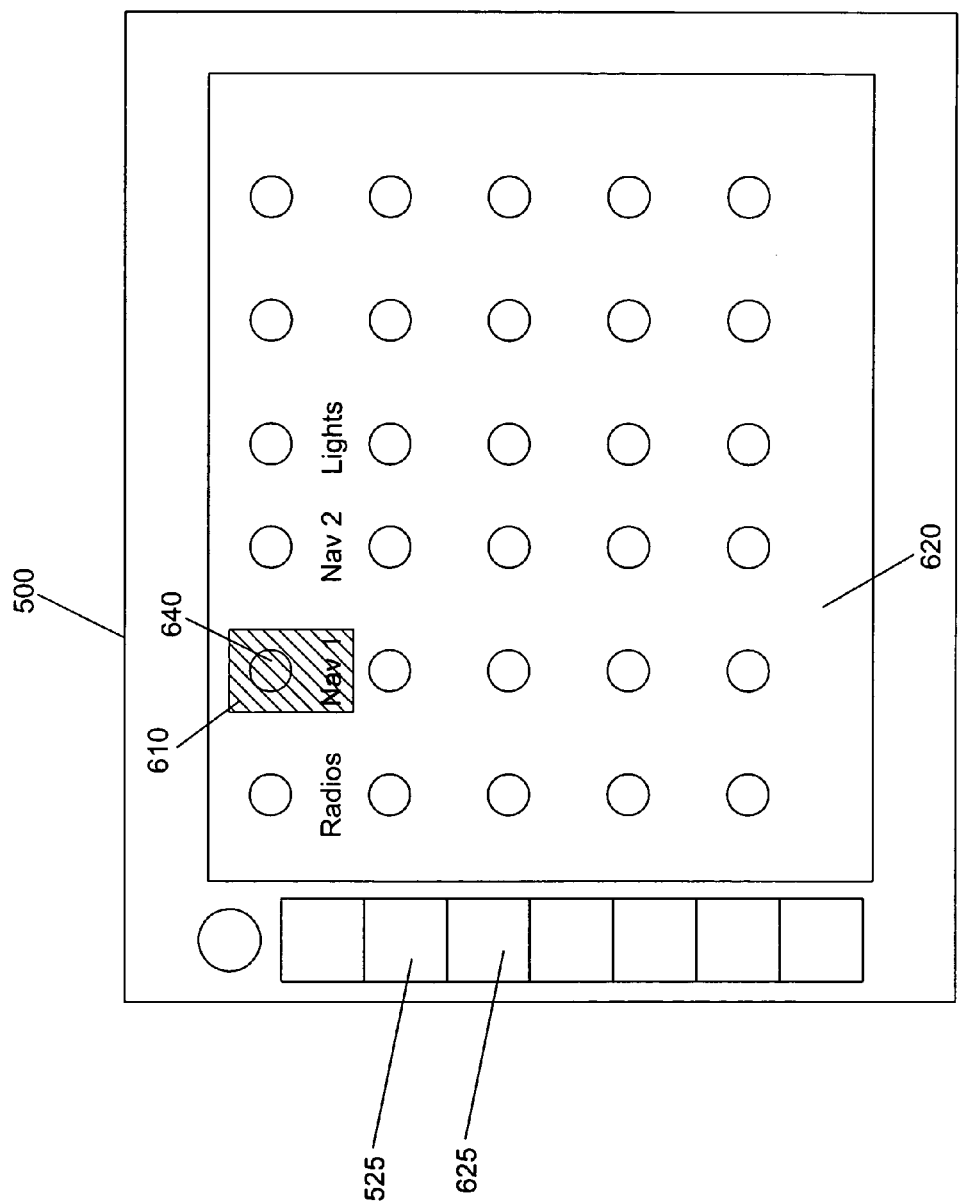
FIG. 6 illustrates a MFD displaying circuit breaker information consistent with an embodiment of the present invention, as shown in FIG. 5.

FIG. 6 illustrates a MFD displaying circuit breaker information consistent with an embodiment of the present invention, as shown in FIG. 5. As shown in FIG. 6, in this implementation, upon being informed that a circuit breaker has tripped as shown in FIG. 5, the pilot may press a button 525 on MFD 500 to display further information regarding the tripped circuit breaker. As shown in FIG. 6, MFD 500 will then display a graphic representation 620 of all or some of the circuit breakers contained in the circuit breaker panel. In this implementation, a red warning block 610 will be illuminated over a tripped circuit beaker. This implementation is merely exemplary, and other implementations may also be used.

Figure 7:
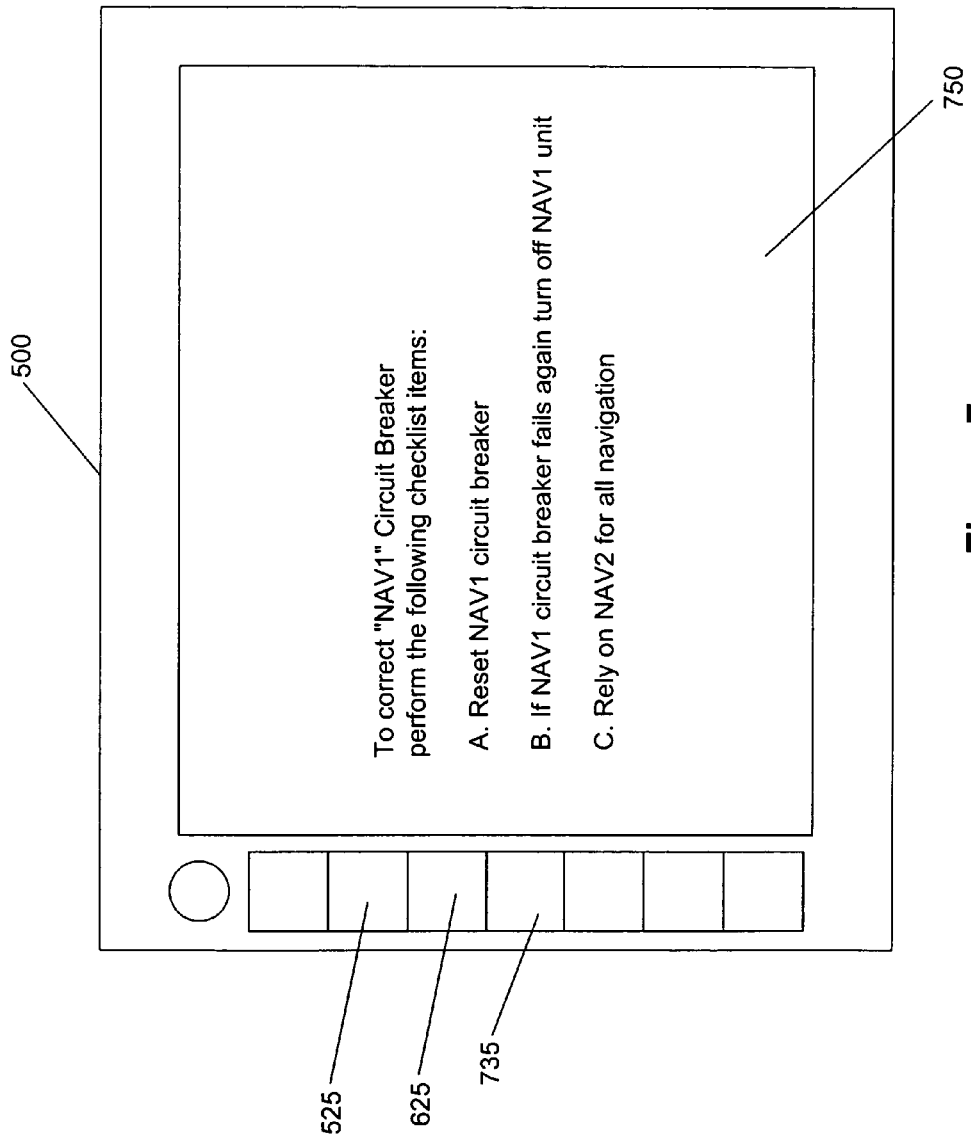
FIG. 7 illustrates a MFD displaying instructions for resetting a circuit breaker consistent with an embodiment of the present invention, as shown in FIG. 6.

As shown in FIG. 6, a circuit breaker for the first navigation system, i.e. "Nav 1," has tripped. In this implementation, MFD 500 displays warning block 610 over a graphic representation 640 of "NAV 1" circuit breaker. The pilot may then access the circuit breaker panel and reset the tripped NAV1 circuit breaker. In another implementation, the pilot may press a button 625 to obtain instructions on how to reset the tripped circuit breaker as shown in FIG. 7. This implementation is merely exemplary, and other implementations may also be used.

FIG. 7 illustrates a MFD displaying instructions for resetting a circuit breaker consistent with an embodiment of the present invention, as shown in FIG. 6. As shown in FIG. 7, upon learning that a circuit breaker has tripped, the pilot may press a button 625 on MFD 500 to obtain instructions 750 on resetting the circuit breaker. The pilot may then follow instructions 750 to reset the circuit breaker. If the instructions require more than one page (or screen), the pilot may move through the pages with button 735. This implementation is merely exemplary, and other implementations may also be used.

VI. CONCLUSION

As described above, therefore, other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents. In this context, equivalents mean each and every implementation for carrying out the functions recited in the claims, even if not explicitly described therein.

What is claimed is:

1. An aircraft comprising:
   a cockpit;
   a circuit breaker box located in the cockpit of the aircraft and adapted for use in the cockpit of the aircraft;
   a circuit breaker panel located in the circuit breaker box;
   a plurality of circuit breakers located on the circuit breaker panel; and
   an output device located in the cockpit of the aircraft, the output device being coupled to the circuit breakers and displaying information about the circuit breakers and further comprising:
   a multifunction display comprising an input device located in the cockpit of the aircraft and adapted to display:
   a warning that a circuit breaker has tripped and the identity of the tripped circuit breaker upon the occurrence of a circuit breaker trip event;
   a graphic representation of at least part of the circuit breaker panel corresponding to the appearance of the circuit breakers on the circuit breaker panel upon operation of the input device after display of the warning; and
   an indication on the graphic representation of the identity of the tripped circuit breaker.

2. A method of monitoring circuit breakers in an aircraft with a circuit breaker monitoring system comprising:
   monitoring a circuit breaker panel in an aircraft, the circuit breaker panel being located in a circuit breaker box;
   receiving a signal indicating detection of a circuit breaker trip event; and
   sending a warning signal to a display in the aircraft;
   displaying a warning indicator on the display including the identity of the tripped circuit breaker substantially coinciding with the circuit breaker trip event;
   displaying a graphic representation of at least part of the circuit breaker panel corresponding to the appearance of the circuit breakers on the circuit breaker panel on the display; and
   indicating a tripped circuit breaker on the graphic representation of the circuit breaker panel.

3. The aircraft of claim 1, wherein the multifunction display is further adapted to display information regarding the tripped circuit breaker upon operation of the input device after display of the graphic representation.

4. The aircraft of claim 1, wherein the warning identifies the system of the aircraft affected by the circuit breaker trip event.

5. The aircraft of claim 1, wherein the indication of the tripped circuit breaker on the graphic representation comprises altering the color of the graphic representation of the tripped circuit breaker.

6. The aircraft of claim 3, wherein the information regarding the tripped circuit breaker includes instructions for resetting the tripped circuit breaker.

7. The aircraft of claim 6, wherein the information regarding the tripped circuit breaker includes instructions for the pilot if the tripped circuit breaker cannot be reset.

8. The method of claim 2, further comprising displaying information on the display regarding the tripped circuit breaker upon operation of the input device after display of the graphic representation.

9. The method of claim 2, wherein displaying a warning further includes displaying the identity of the system of the aircraft affected by the circuit breaker trip event on the display.

10. The method of claim 2, wherein indicating a tripped circuit breaker on the graphic representation of the circuit breaker panel further includes altering the color of the graphic representation of the tripped circuit breaker.

11. The method of claim 2, wherein indicating a tripped circuit breaker on the graphic representation of the circuit breaker panel further includes highlighting a shape around the graphic representation of the tripped circuit breaker.

12. The method of claim 2, further comprising displaying instructions for resetting the tripped circuit breaker on the display.

13. The method of claim 2, further comprising displaying instructions for the pilot if the tripped circuit breaker cannot be reset on the display.

14. A method of monitoring circuit breakers in an aircraft with a circuit breaker monitoring system comprising:
   monitoring a circuit breaker panel in an aircraft, the circuit breaker panel being located in a circuit breaker box;
   receiving a signal indicating detection of a circuit breaker trip event; and
   sending a warning signal to a display in the aircraft;
   displaying a warning indicator on the display including the identity of the tripped circuit breaker substantially coinciding with the circuit breaker trip event;
   displaying a graphic representation of at least part of the circuit breaker panel corresponding to the appearance of the circuit breakers on the circuit breaker panel on the display;
   indicating a tripped circuit breaker on the graphic representation of the circuit breaker panel;
   displaying the identity of the system of the aircraft affected by the circuit breaker trip event on the display;
   displaying possible causes of the circuit breaker trip event on the display;
   displaying instructions to correct the possible cause of the circuit breaker trip event on the display;
   displaying instructions for resetting the tripped circuit breaker on the display; and
   displaying instructions for the pilot if the tripped circuit breaker cannot be reset on the display.

15. An aircraft comprising:
   a cockpit;
   a circuit breaker box located in the cockpit of the aircraft and adapted for use in the cockpit of the aircraft, the circuit breaker box having at least one open surface;
   a circuit breaker panel located in the circuit breaker box such that it is accessible on the open surface;
   a plurality of circuit breakers located on the circuit breaker panel;

a door mounted on the circuit breaker box and operable between a first position with respect to the open surface covering the circuit breaker panel and a second position with respect to the open surface revealing the circuit breaker panel;

a sliding mechanism for operating the door comprising:
tracks located in the circuit breaker box;
a plurality of rollers attached to the door and located on the tracks; and
a motor for operating the door; and an output device located in the cockpit of the aircraft, the output device being coupled to the circuit breakers and displaying information about the circuit breakers and further comprising:

a multifunction display comprising an input device located in the cockpit of the aircraft and adapted to display a warning that a circuit breaker has tripped upon the occurrence of a circuit breaker trip event.

16. The aircraft of claim 15, wherein the multifunction display is further adapted to display the identity of the tripped circuit breaker upon the occurrence of a circuit breaker trip event.

17. The aircraft of claim 15, wherein the multifunction display is further adapted to display a graphic representation of at least part of the circuit breaker panel corresponding to the appearance of the circuit breakers on the circuit breaker panel upon operation of the input device after display of the warning and an indication on the graphic representation of the identity of the tripped circuit breaker.

18. The aircraft of claim 15, wherein the multifunction display is further adapted to display information regarding the tripped circuit breaker upon operation of the input device after display of the graphic representation.

19. The aircraft of claim 15, wherein the warning identifies the system of the aircraft affected by the circuit breaker trip event.

20. The aircraft of claim 17, wherein the indication of the tripped circuit breaker on the graphic representation comprises altering the color of the graphic representation of the tripped circuit breaker.

21. The aircraft of claim 18, wherein the information regarding the tripped circuit breaker includes instructions for resetting the tripped circuit breaker.

22. The aircraft of claim 21, wherein the information regarding the tripped circuit breaker includes instructions for the pilot if the tripped circuit breaker cannot be reset.

23. An aircraft comprising:
a cockpit;
a circuit breaker box located in the cockpit of the aircraft and adapted for use in the cockpit of the aircraft, the circuit breaker box having at least one open surface;
a circuit breaker panel located in the circuit breaker box such that it is accessible on the open surface;
a plurality of circuit breakers located on the circuit breaker panel;
a door mounted on the circuit breaker box and operable between a first position with respect to the open surface covering the circuit breaker panel and a second position with respect to the open surface revealing the circuit breaker panel;
a sliding mechanism for operating the door comprising:
tracks located in the circuit breaker box;
a plurality of rollers attached to the door and located on the tracks; and
a motor for operating the door; and
an output device located in the cockpit of the aircraft, the output device being coupled to the circuit breakers and displaying information about the circuit breakers and further comprising:
a multifunction display comprising an input device located in the cockpit of the aircraft and adapted to display:
a warning that a circuit breaker has tripped and the identity of the tripped circuit breaker upon the occurrence of a circuit breaker trip event and
a graphic representation of at least part of the circuit breaker panel corresponding to the appearance of the circuit breakers on the circuit breaker panel upon operation of the input device after display of the warning and an indication on the graphic representation of the identity of the tripped circuit breaker.

24. The aircraft of claim 23, wherein the multifunction display is further adapted to display information regarding the tripped circuit breaker upon operation of the input device after display of the graphic representation.

25. The aircraft of claim 23, wherein the warning identifies the system of the aircraft affected by the circuit breaker trip event.

26. The aircraft of claim 23, wherein the indication of the tripped circuit breaker on the graphic representation comprises altering the color of the graphic representation of the tripped circuit breaker.

27. The aircraft of claim 24, wherein the information regarding the tripped circuit breaker includes instructions for resetting the tripped circuit breaker.

28. The aircraft of claim 27, wherein the information regarding the tripped circuit breaker includes instructions for the pilot if the tripped circuit breaker cannot be reset.

* * * * *